United States Patent
Warshauer-Baker et al.

(10) Patent No.: US 12,181,887 B2
(45) Date of Patent: Dec. 31, 2024

(54) OCCUPANCY GRID MOVIE SYSTEM

(71) Applicant: GM GLOBAL TECHNOLOGY OPERATIONS LLC, Detroit, MI (US)

(72) Inventors: Gabriel Warshauer-Baker, Mountain View, CA (US); Kevin Chu, San Mateo, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 40 days.

(21) Appl. No.: 18/328,354

(22) Filed: Jun. 2, 2023

(65) Prior Publication Data

US 2023/0315112 A1  Oct. 5, 2023

Related U.S. Application Data

(60) Continuation of application No. 17/086,200, filed on Oct. 30, 2020, now Pat. No. 11,703,873, which is a
(Continued)

(51) Int. Cl.
*G05D 1/00* (2024.01)
*B60W 10/06* (2006.01)
(Continued)

(52) U.S. Cl.
CPC ......... *G05D 1/0221* (2013.01); *G05D 1/0231* (2013.01); *B60W 10/06* (2013.01);
(Continued)

(58) Field of Classification Search
CPC ...... G05D 1/0221; G05D 1/0231; G05D 1/00; G05D 1/0212; G05D 1/0274;
(Continued)

(56) References Cited

U.S. PATENT DOCUMENTS

| | | | |
|---|---|---|---|
| 8,244,455 B2 * | 8/2012 | Case | G01C 21/005 701/417 |
| 9,248,834 B1 | 2/2016 | Ferguson et al. | |

(Continued)

OTHER PUBLICATIONS

"Restriction Requirement for U.S. Appl. No. 16/049,754", Mailed Date: Jun. 29, 2020, 6 Pages. (CRSP-0034).
(Continued)

*Primary Examiner* — Behrang Badii

(57) ABSTRACT

Various technologies described herein pertain to generating an occupancy grid movie for utilization in motion planning for the autonomous vehicle. The occupancy grid movie can be generated for a given time and can include time-stepped occupancy grids for future times that are at predefined time intervals from the given time. The time-stepped occupancy grids include cells corresponding to regions in an environment surrounding the autonomous vehicle. Probabilities can be assigned to the cells specifying likelihoods that the regions corresponding to the cells are occupied at the future times. Moreover, cached query objects that respectively specify indices of cells of a grid occupied by a representation of an autonomous vehicle at corresponding orientations are described herein. An occupancy grid for the environment surrounding the autonomous vehicle can be queried to determine whether cells of the occupancy grid are occupied utilizing a cached query object from the cache query objects.

20 Claims, 14 Drawing Sheets

Related U.S. Application Data division of application No. 16/049,754, filed on Jul. 30, 2018, now Pat. No. 10,824,156.

(51) Int. Cl.
| | |
|---|---|
| B60W 10/18 | (2012.01) |
| B60W 10/20 | (2006.01) |
| G01C 21/00 | (2006.01) |
| G06F 16/29 | (2019.01) |

(52) U.S. Cl.
CPC ............. *B60W 10/18* (2013.01); *B60W 10/20* (2013.01); *B60W 2554/00* (2020.02); *B60W 2710/06* (2013.01); *B60W 2710/18* (2013.01); *B60W 2710/20* (2013.01); *G01C 21/00* (2013.01); *G05D 1/00* (2013.01); *G05D 1/0212* (2013.01); *G06F 16/29* (2019.01)

(58) Field of Classification Search
CPC .... G05D 1/0238; B60W 10/06; B60W 10/18; B60W 10/20; B60W 2554/00; B60W 2710/06; B60W 2710/18; B60W 2710/20; B60W 60/001; G01C 21/00; G01C 21/3446; G06F 16/29
See application file for complete search history.

(56) References Cited

U.S. PATENT DOCUMENTS

| | | | |
|---|---|---|---|
| 10,290,116 | B2 | 5/2019 | Laugier et al. |
| 10,824,156 | B1 | 11/2020 | Warshauer-Baker et al. |
| 2014/0201126 | A1 | 7/2014 | Zadeh et al. |
| 2016/0149882 | A1 | 5/2016 | Srivastava |
| 2016/0253619 | A1 | 9/2016 | Miles et al. |
| 2017/0057474 | A1 | 3/2017 | Zeng et al. |
| 2017/0090481 | A1 | 3/2017 | Clark et al. |
| 2017/0197615 | A1 | 7/2017 | Elie et al. |
| 2017/0285161 | A1 | 10/2017 | Izzat et al. |
| 2018/0059231 | A1 | 3/2018 | Dewberry et al. |
| 2018/0113209 | A1 | 4/2018 | Campbell |
| 2018/0189323 | A1 | 7/2018 | Wheeler |
| 2018/0196439 | A1 | 7/2018 | Levinson et al. |
| 2018/0345958 | A1 | 12/2018 | Lo |
| 2019/0047439 | A1* | 2/2019 | Natroshvili ............ G06V 20/58 |
| 2019/0113927 | A1 | 4/2019 | England et al. |
| 2019/0236955 | A1 | 8/2019 | Hu |
| 2019/0286145 | A1 | 9/2019 | LaFary et al. |
| 2019/0311205 | A1* | 10/2019 | Mittal ................... G06F 18/214 |
| 2019/0364492 | A1 | 11/2019 | Azizi et al. |
| 2020/0148201 | A1 | 5/2020 | King et al. |
| 2020/0285658 | A1 | 9/2020 | Wheeler |
| 2021/0048827 | A1 | 2/2021 | Warshauer-Baker et al. |

OTHER PUBLICATIONS

"Reply to Restriction Requirement for U.S. Appl. No. 16/049,754", Filed Date: Aug. 31, 2020, 10 Pages. (CRSP-0034).

"Notice of Allowance and Fees Due for U.S. Appl. No. 16/049,754", Mailed Date: Sep. 17, 2020, 16 Pages. (CRSP-0034).

"Notice of Allowance and Fees Due for U.S. Appl. No. 17/086,200", Mailed Date: Mar. 2, 2023, 16 Pages.

Notice of Allowance & Fees Due for U.S. Appl. No. 16/049,140, Mar. 31, 2020, 8 Pgs (CRSP-0001).

* cited by examiner

OCCUPANCY GRID MOVIE SYSTEM

CROSS-REFERENCE TO RELATED APPLICATION

This application is a continuation of U.S. patent application Ser. No. 17/086,200, filed on Oct. 30, 2020, and entitled "OCCUPANCY GRID MOVIE SYSTEM", which is a divisional of U.S. Pat. No. 10,824,156, filed on Jul. 30, 2018, and entitled "OCCUPANCY GRID MOVIE SYSTEM", the entireties of which are incorporated herein by reference.

BACKGROUND

An autonomous vehicle is a motorized vehicle that can operate without human conduction. An exemplary autonomous vehicle includes a plurality of sensor systems, such as but not limited to, a lidar sensor system, a camera sensor system, and a radar sensor system, amongst others. The autonomous vehicle operates based upon sensor signals output by the sensor systems.

The sensor signals output by the sensor systems can be utilized by the autonomous vehicle to detect objects in a driving environment surrounding the autonomous vehicle. When planning motion of the autonomous vehicle, an evaluation can be performed to determine whether a proposed location of the autonomous vehicle at a given time intersects a location occupied by a detected object in the environment surrounding the autonomous vehicle. Some conventional techniques utilize geometry checks on objects in the environment surrounding the autonomous vehicle to identify whether a potential location of the autonomous vehicle intersects with locations of these objects in the environment.

Traditional motion planning techniques for identifying intersections between locations of objects detected in the environment surrounding the autonomous vehicle and potential locations of the autonomous vehicle are oftentimes computationally and time intensive. Moreover, a significant number of these queries are commonly performed in a relatively short period of time when generating a motion plan. As the number of queries to be performed in a period of time continues to increase, it is desirable to decrease an amount of time and an amount of consumed computational resources for performance of each query.

SUMMARY

The following is a brief summary of subject matter that is described in greater detail herein. This summary is not intended to be limiting as to the scope of the claims.

Described herein are various technologies that pertain to controlling motion planning of an autonomous vehicle. With more specificity, described herein are various technologies pertaining to generating an occupancy grid movie for utilization in motion planning for the autonomous vehicle. The occupancy grid movie can be generated for a given time and can include time-stepped occupancy grids for future times that are at predefined time intervals from the given time. Accordingly, while computational resources are utilized to generate the occupancy grid movie for the given time, the occupancy grid movie can be utilized to perform queries as part of motion planning; these queries can be take less time and can utilize less computational resources as compared to conventional approaches for identifying intersections between proposed locations of the autonomous vehicle and locations of objects in an environment surrounding the autonomous vehicle over time.

According to various embodiments, a sensor system of an autonomous vehicle can be configured to output data that is indicative of an environment surrounding the autonomous vehicle. Further, a computing system of the autonomous vehicle can track an object in the environment surrounding the autonomous vehicle based on data outputted by the sensor system for a given time. The object tracked in the environment can be a tracked object. Moreover, the computing system can generate an accumulated occupancy grid for the given time based at least in part on the data outputted by the sensor system for the given time. The tracked object in the environment can be removed to generate the accumulated occupancy grid for the given time. The computing system can further predict positions for the tracked object in the environment at future times. The future times can be at predefined time intervals from the given time. Moreover, the computing system can generate an occupancy grid movie based on the accumulated occupancy grid and the positions predicted for the tracked object in the environment at the future times. The occupancy grid movie includes time-stepped occupancy grids for the future times. A motion plan can be generated by the computing system for the autonomous vehicle utilizing the occupancy grid movie. For instance, the motion plan for the autonomous vehicle can be generated by querying the time-stepped occupancy grids for the future times. According to an example, a particular time-stepped occupancy grid from the time-stepped occupancy grids can be queried to determine whether particular cells of the particular time-stepped occupancy grid are occupied. The computing system can further control an engine of the autonomous vehicle, a braking system of the autonomous vehicle, and/or a steering system of the autonomous vehicle based on the motion plan for the autonomous vehicle.

In accordance with various embodiments, the time-stepped occupancy grids for the future times in the occupancy grid movie can each include cells corresponding to regions in the environment. Moreover, probabilities can be assigned to the cells specifying likelihoods that the regions corresponding to the cells are occupied at the future times. Thus, when generating the motion plan for the autonomous vehicle utilizing the occupancy grid movie, the computing system can query particular cells of a particular time-stepped occupancy grid from the time-stepped occupancy grids for probabilities specifying likelihoods that regions corresponding to the particular cells are occupied.

Moreover, pursuant to various embodiments, described herein are various techniques for creating and/or utilizing cached query objects that respectively specify indices of cells of a grid occupied by a representation of an autonomous vehicle at corresponding orientations. An occupancy grid for an environment surrounding the autonomous vehicle can be queried to determine whether cells of the occupancy grid are occupied utilizing a cached query object from the cache query objects. For instance, the occupancy grid that is queried can be one of the time-stepped occupancy grids of the occupancy grid movie. Accordingly, the cached query objects can be used to generate the queries for identifying intersections between proposed locations of the autonomous vehicle and locations of objects in an environment surrounding the autonomous vehicle over time. Use of the cached query objects enables reducing time and computational resources when generating queries as compared to conventional query generation approaches.

According to various embodiments, memory of the computing system of the autonomous vehicle can store cached query objects that respectively specify indices of cells of a grid occupied by a representation of the autonomous vehicle at corresponding orientations (e.g., 360 cached query objects for a representation of the autonomous vehicle rotated at 1 degree increments, 36 cached query objects for a representation of the autonomous vehicle rotated at 10 degree increments). The computing system can select a cached query object from the cached query objects based on a proposed orientation of the autonomous vehicle (e.g., a cached query object corresponding to an orientation of 70 degrees can be selected). Further, the cached query object can be translated based on a proposed location of the autonomous vehicle. Further, the computing system can query cells of an occupancy grid for an environment surrounding the autonomous vehicle, utilizing the cached query object as translated, to determine whether such cells are occupied. The commuting system can generate a motion plan for the autonomous vehicle based on whether the cells of the occupancy grid are occupied. Moreover, the computing system can control the engine, the braking system, and/or the steering system of the autonomous vehicle based on the motion plan for the autonomous vehicle.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
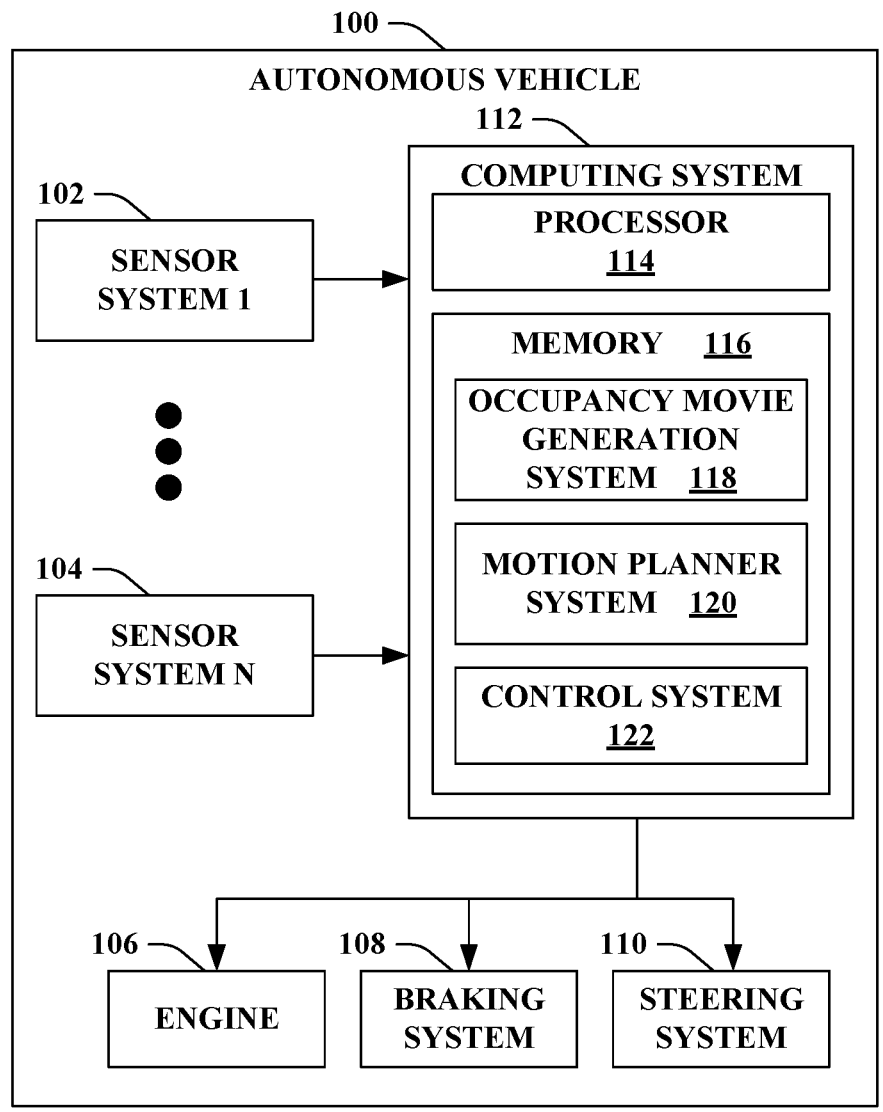
FIG. 1 illustrates a functional block diagram of an exemplary autonomous vehicle.

Various technologies pertaining to generating an occupancy grid movie and/or querying occupancy grid(s) (from the occupancy grid movie) utilizing cached query objects as part of motion planning for an autonomous vehicle are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something."

Many of the examples set forth herein describe occupancy grids. It is contemplated that substantially any size occupancy grid is intended to fall within the scope of the hereto appended claims. For instance, a number of rows of cells and a number of columns of cells in an occupancy grid can each be on the order of hundreds. Moreover, a cell of an occupancy grid can represent a particular sized region of an environment surrounding an autonomous vehicle. For example, the particular sized region of the environment represented by a cell of an occupancy grid can be a 10 centimeter by 10 centimeter region, a 15 centimeter by 15 centimeter region, a 20 centimeter by 20 centimeter region, or the like of the environment surrounding the autonomous vehicle.

Referring now to the drawings, FIG. 1 illustrates an autonomous vehicle 100. The autonomous vehicle 100 can navigate about roadways without human conduction based upon sensor signals outputted by sensor systems of the autonomous vehicle 100. The autonomous vehicle 100 includes a plurality of sensor systems, namely, a sensor system 1 102, . . . , and a sensor system N 104, where N can be substantially any integer greater than 1 (collectively referred to herein as sensor systems 102-104). The sensor systems 102-104 are of different types and are arranged about the autonomous vehicle 100. For example, the sensor system 1 102 may be a lidar sensor system and the sensor system N 104 may be a camera (image) system. Other exemplary sensor systems included in the sensor systems 102-104 can include radar sensor systems, GPS sensor systems, sonar sensor systems, infrared sensor systems, and the like.

The autonomous vehicle 100 further includes several mechanical systems that are used to effectuate appropriate motion of the autonomous vehicle 100. For instance, the mechanical systems can include, but are not limited to, an engine 106, a braking system 108, and a steering system 110. The engine 106 may be an electric engine or a combustion engine. The braking system 108 can include an engine brake, brake pads, actuators, and/or any other suitable componentry that is configured to assist in decelerating the autonomous vehicle 100. The steering system 110 includes suitable componentry that is configured to control the direction of movement of the autonomous vehicle 100.

The autonomous vehicle 100 additionally includes a computing system 112 that is in communication with the sensor systems 102-104, the engine 106, the braking system 108, and the steering system 110. The computing system 112 includes a processor 114 and memory 116; the memory 116 includes computer-executable instructions that are executed by the processor 114. Pursuant to various examples, the processor 114 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 116 of the computing system 112 includes an occupancy movie generation system 118 that can generate an occupancy grid movie for an environment surrounding the autonomous vehicle 100 for a given time. The occupancy grid movie can include time-stepped occupancy grids for future times that are at predefined time intervals from the given time. According to an illustration, one or more of the sensor systems 102-104 can output data that is indicative of the environment surrounding the autonomous vehicle 100. Following this illustration, the occupancy movie generation system 118 can generate an occupancy grid movie based on the data outputted by the one or more sensor systems 102-104.

Moreover, the memory 116 of the computing system 112 can include a motion planner system 120 that can generate a motion plan for the autonomous vehicle 100 utilizing the occupancy grid movie generated by the occupancy movie generation system 118. For instance, the motion planner system 120 can generate the motion plan for the autonomous vehicle 100 utilizing the occupancy grid movie by querying the time-stepped occupancy grids for the future times. According to an illustration, the motion planner system 120 can query whether particular cells of a particular time-stepped occupancy grid from the time-stepped occupancy grids of the occupancy grid movie are occupied. The particular cells for which the motion planner system 120 performs the query can represent the autonomous vehicle 100. For instance, a location of the particular cells in the particular time-stepped occupancy grid can indicate a proposed location of the autonomous vehicle in the environment at a future time corresponding to the particular time-stepped occupancy grid. Moreover, an orientation of the particular cells in the particular time-stepped occupancy grid can indicate a proposed orientation of the autonomous vehicle in the environment at the future time corresponding to the particular time-stepped occupancy grid.

The memory 116 additionally includes a control system 122. The control system 122 is configured to control at least one of the mechanical systems of the autonomous vehicle 100 (e.g., at least one of the engine 106, the braking system 108, and/or the steering system 110). For instance, the control system 122 can control the engine 106, the braking system 108, and/or the steering system 110 based on the motion plan for the autonomous vehicle generated by the motion planner system 120.

Figure 2:
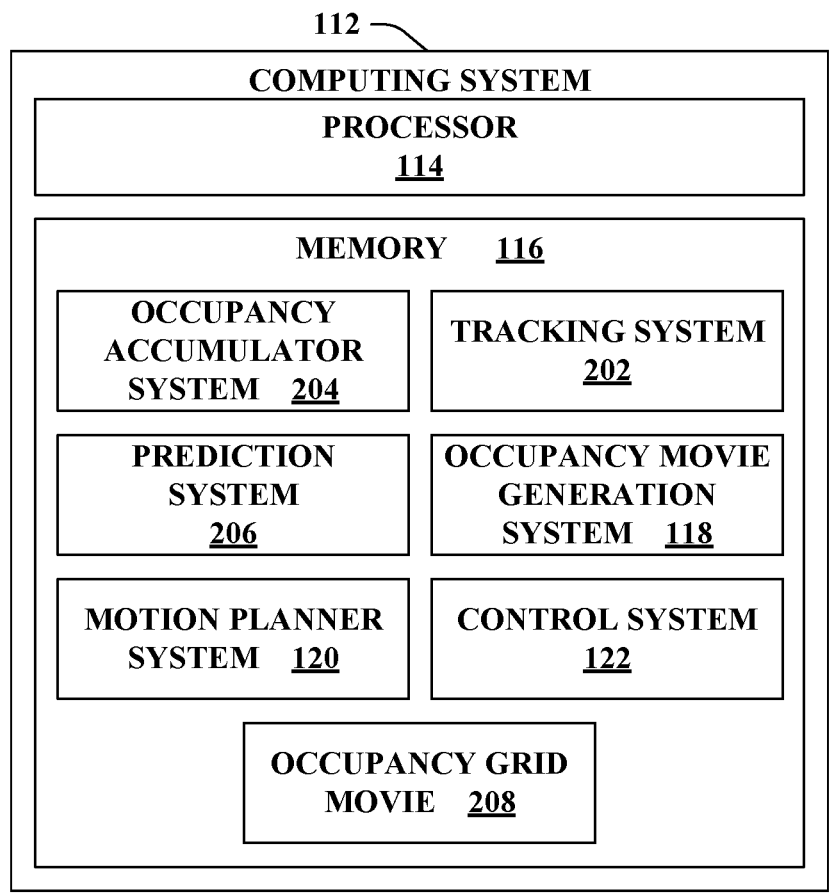
FIG. 2 illustrates a functional block diagram of a computing system of the autonomous vehicle of FIG. 1 in accordance with various examples.

Now turning to FIG. 2, illustrated is the computing system 112 of the autonomous vehicle 100 of FIG. 1 described in more detail. The computing system 112 again includes the processor 114 and the memory 116. As noted above, the memory 116 can include the occupancy movie generation system 118, the motion planner system 120, and the control system 122.

The memory 116 can include a tracking system 202. The tracking system 202 can track an object in the environment surrounding the autonomous vehicle 100 based on data outputted by a sensor system (e.g., one or more of the sensor systems 102-104 of the autonomous vehicle 100) for a given time. For instance, it is contemplated that the sensor system can a lidar sensor system, a radar sensor system, or a camera sensor system. Further, the object tracked in the environment can be referred to as a tracked object. The tracked object can be, for instance, a car, a truck, a bus, a bike, a pedestrian, or the like. The tracking system 202 can identify where the object is located in the environment surrounding the autonomous vehicle 100 based on the data outputted by the sensor system for the given time. Moreover, the tracking system 202 can determine a speed at which such object is moving, a direction of movement of the object, and so forth. While one object is described as being tracked, it is contemplated that substantially any number of objects in the environment surrounding the autonomous vehicle 100 can be tracked.

Moreover, the memory 116 of the computing system 112 can include an occupancy accumulator system 204. The occupancy accumulator system 204 can generate an accumulated occupancy grid for the given time based at least in part on the data outputted by the sensor system for the given time. The occupancy accumulator system 204 can remove the tracked object(s) in the environment to generate the accumulated occupancy grid for the given time. Moreover, the occupancy accumulator system 204 can further generate the accumulated occupancy grid for the given time based on prior map data. The prior map data can specify an undrivable area in the environment surrounding the autonomous vehicle 100. Thus, for instance, the accumulated occupancy grid can include at least one cell that signifies the undrivable area in the environment. The occupancy accumulator system 204 can also detect an unknown area in the environment surrounding the autonomous vehicle 100 based on the data outputted by the sensor system for the given time. The unknown area in the environment, for instance, can be occluded from a perspective of the sensor system. Accordingly, the occupancy accumulator system 204 can generate the accumulated occupancy grid for the given time, such that at least one cell signifies the unknown area in the environment.

The memory 116 of the computing system 112 of the autonomous vehicle 100 can further include a prediction system 206. The prediction system 206 can predict positions of the tracked object in the environment at future times. Accordingly, the prediction system 206 can predict movement of the tracked object in the environment. The future times for which the positions of the tracked object are predicted in the environment can be at predefined time intervals from the given time. For instance, the predefined time intervals can be at half second intervals, one second intervals, one and a half second intervals, two second intervals, or the like. Moreover, it is to be appreciated that substantially any number of future times are intended to fall within the scope of the hereto appended claims. According to an illustration, the prediction system 206 can predict positions of the tracked object for 20 future times, each at half second intervals; thus, predictions can be provided by the prediction system 206 for a next 10 seconds from the given time. It is to be appreciated, however, that the claimed subject matter is not limited to the foregoing illustration. Moreover, it is contemplated that if the environment includes more than one tracked object, then the prediction system 206 can predict respective positions of each of the tracked objects.

The prediction system 206, for instance, can analyze the tracked object(s) (e.g., based on locations, speeds, directions of travel, etc. of each tracked object) in the environment surrounding the autonomous vehicle 100 to predict how the tracked object(s) will move over a future looking period of time. According to an example, the prediction system 206 can predict how the tracked object(s) will move over the next Z seconds from the given time, generating a list of positions for each tracked object at the predefined time intervals over the next Z seconds.

The occupancy movie generation system 118 can generate an occupancy grid movie 208. As noted above, the occupancy grid movie 208 can include time-stepped occupancy grids for the future times. The occupancy movie generation system 118 can generate the occupancy grid movie 208 based on the accumulated occupancy grid (generated by the occupancy accumulator system 204) and the positions predicted for the tracked object(s) in the environment at the future times (predicted by the prediction system 206).

It is to be appreciated that a number of time-stepped occupancy grids in the occupancy grid movie 208 can be predefined. Accordingly, the predefined number of time-stepped occupancy grids in an occupancy grid movie (e.g., the occupancy grid movie 208) generated by the occupancy movie generation system 118 can be 10, 15, 20, 25, 30, 35, or substantially any other integer. By way of illustration, if the prediction system 206 predicts positions of tracked object(s) for 24 future times, then 24 time-stepped occupancy grids can be generated by the occupancy movie generation system 118 to form the occupancy grid movie 208; yet, the claimed subject matter is not limited to the foregoing illustration.

Moreover, the motion planner system 120 can generate the motion plan for the autonomous vehicle 100 utilizing the occupancy grid movie 208. Further, the control system 122 can control the engine 106, the braking system 108, and/or the steering system 110 of the autonomous vehicle 100 based on the motion plan for the autonomous vehicle 100.

It is to be appreciated that a differing occupancy grid movie can be generated by the occupancy movie generation system 118 for a differing time. The differing time can differ from the given time noted above. It is contemplated that the differing occupancy grid movie can be generated in a similar manner to the generation of the occupancy grid movie 208 for the given time set forth above. Moreover, the differing occupancy grid movie can include differing time-stepped occupancy grids for differing future times that are at the predefined time intervals from the differing time. Accordingly, the differing occupancy grid movie can include the same number of time-stepped occupancy grids as compared to the occupancy grid movie 208. Thus, the motion planner system 120 can generate a differing motion plan for the autonomous vehicle utilizing the differing occupancy grid movie, and the control system 122 can control the engine 106, the braking system 108, and/or the steering system 110 of the autonomous vehicle 100 based on the differing motion plan for the autonomous vehicle 100.

Pursuant to an example, it is contemplated that the occupancy movie generation system 118 can generate a new occupancy grid movie (e.g., the occupancy grid movie 208) on the order of every 100 ms; however, the claimed subject matter is not limited to the foregoing frequency of generation of new occupancy grid movies. In accordance with another example, the motion planner system 120 can query time-stepped occupancy grids in the occupancy grid movie 208 on the order of thousands of times when generating a motion plan for the autonomous vehicle 100 for a given time corresponding to the occupancy grid movie 208. Accordingly, generation of the occupancy grid movie 208 by the occupancy movie generation system 118 can enable reducing an amount of time and/or computational resources utilized for performance of each of the queries executed by the motion planner system 120, thereby enabling the motion planner system 120 to perform an increased number queries in a given time period as compared to conventional approaches.

Figure 3:
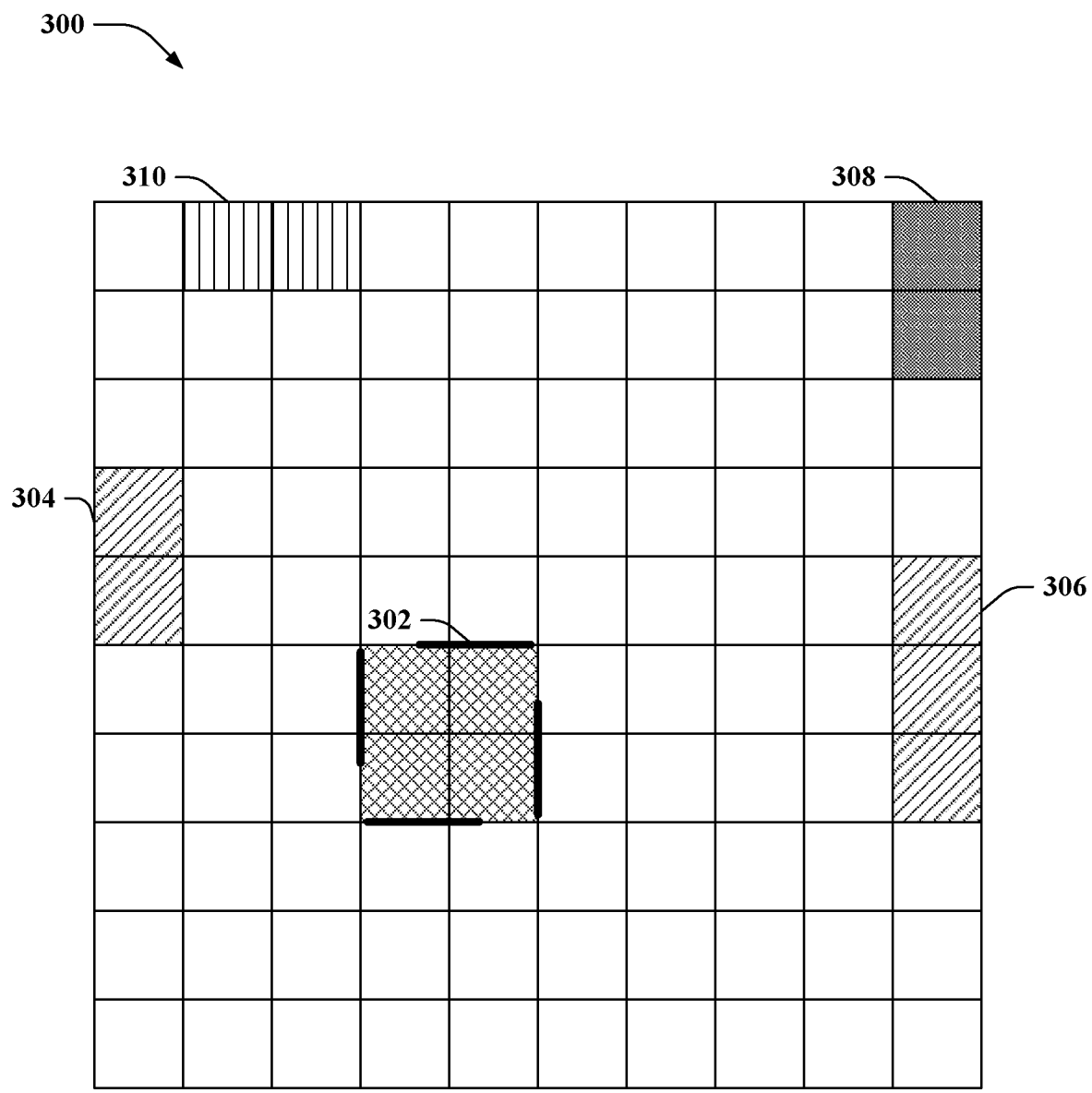
FIG. 3 illustrates an exemplary accumulated occupancy grid for a given time.

Now turning to FIG. 3, illustrated is an exemplary accumulated occupancy grid 300 for a given time. The accumulated occupancy grid 300 shown in FIG. 3 includes 10 rows and 10 columns of cells; however, it is contemplated that the depicted grid size is provided for illustration purposes, and other grid sizes are intended to fall within the scope of the hereto appended claims. As noted above, the occupancy accumulator system 204 can generate the accumulated occupancy grid 300 for the given time based at least in part on the data outputted by the sensor system for the given time (e.g., data outputted by a lidar sensor system, a radar sensor system, a camera sensor system, etc.).

In the exemplary accumulated occupancy grid 300, cells 302 can correspond to a location of a tracked object in the environment. The occupancy accumulator system 204 can remove the tracked objects when generating the accumulated occupancy grid 300; thus, the cells 302 of the accumulated occupancy grid are modified so as to not represent the tracked object being at locations corresponding to the cells 302 (depicted by the dashed boundary of the cells 302).

Moreover, in the exemplary accumulated occupancy grid 300, cells 304 and cells 306 can correspond to locations of non-tracked objects in the data outputted by the sensor system. For instance, the non-tracked objects can be static objects (e.g., non-moving objects) in the environment surrounding the autonomous vehicle. Accordingly, the cells 304 and the cells 306 corresponding to the non-tracked objects can remain in the accumulated occupancy grid 300. Pursuant to an example, the cells 304 and the cells 306 can each be assigned a respective value between 1 and 100 that specifies a likelihood that a region corresponding to the cell in the environment surrounding the autonomous vehicle is occupied.

As noted above, the occupancy accumulator system 204 can generate the accumulated occupancy grid 300 based on prior map data. The prior map data, for instance, can specify that cells 308 in the exemplary accumulated occupancy grid 300 correspond to an undrivable area in the environment surrounding the autonomous vehicle (e.g., the cells 308 can correspond to a location of a sidewalk, a median, or the like). According to an example, the cells 308 corresponding to the undrivable area can be assigned a particular value in the accumulated occupancy grid 300 indicative of an undrivable area (e.g., assigned a value of −2).

Moreover, the occupancy accumulator system 204 can detect an unknown area in the environment surrounding the autonomous vehicle 100 based on the data outputted by the sensor system for the given time. For instance, the cells 310 in the exemplary accumulated occupancy grid 300 can correspond to an unknown area in the environment. Accordingly, the cells 310 corresponding to the unknown area can be assigned a particular value indicative in the accumulated occupancy grid 300 indicative of an unknown area (e.g., assigned a value of −1).

Figure 4:
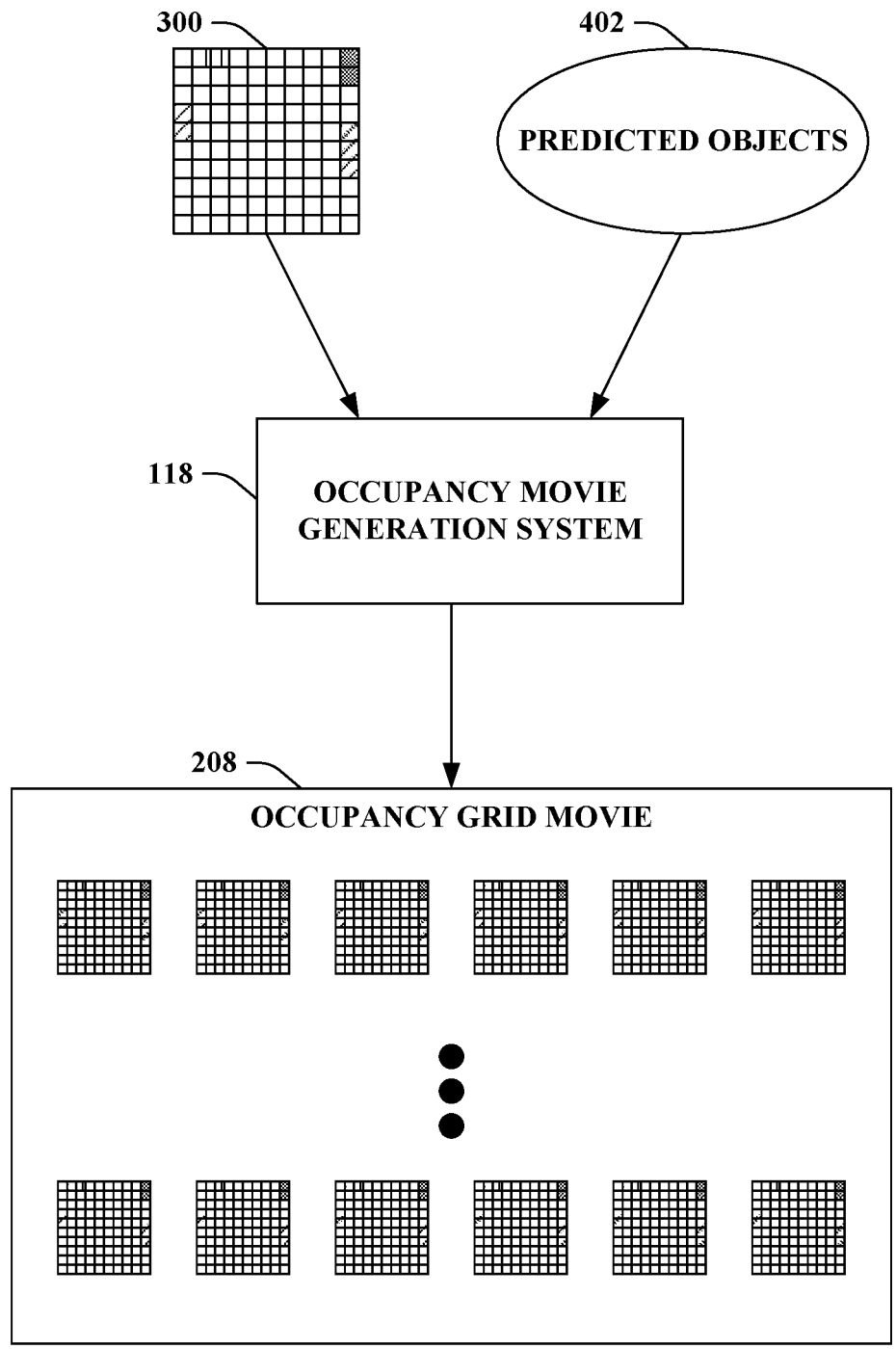
FIG. 4 illustrates an occupancy movie generation system of the autonomous vehicle of FIG. 1.

Now turning to FIG. 4, illustrated is the occupancy movie generation system 118 of the autonomous vehicle 100 according to various embodiments. As depicted, the accumulated occupancy grid 300 of FIG. 3 (generated by the occupancy accumulator system 204, with the cells 302 not representing the tracked object) and predicted objects 402 (generated by the prediction system 206) can be inputted to the occupancy movie generation system 118. Based on the accumulated occupancy grid 300 and the predicted objects 402 (e.g., positions predicted for the tracked objects in the environment of the future times), the occupancy movie generation system 118 can generate the occupancy grid movie 208. In particular, the occupancy grid movie 208 can include a predetermined number of time-stepped occupancy grids (e.g., the occupancy grid movie 208 can include 24 time-stepped occupancy grids corresponding to 24 future times). Each of the time-stepped occupancy grids of the occupancy grid movie 208 can include the accumulated occupancy grid 300 combined with the predicted positions for the tracked objects (e.g., the predicted objects 402) at the corresponding future time.

Figure 5:
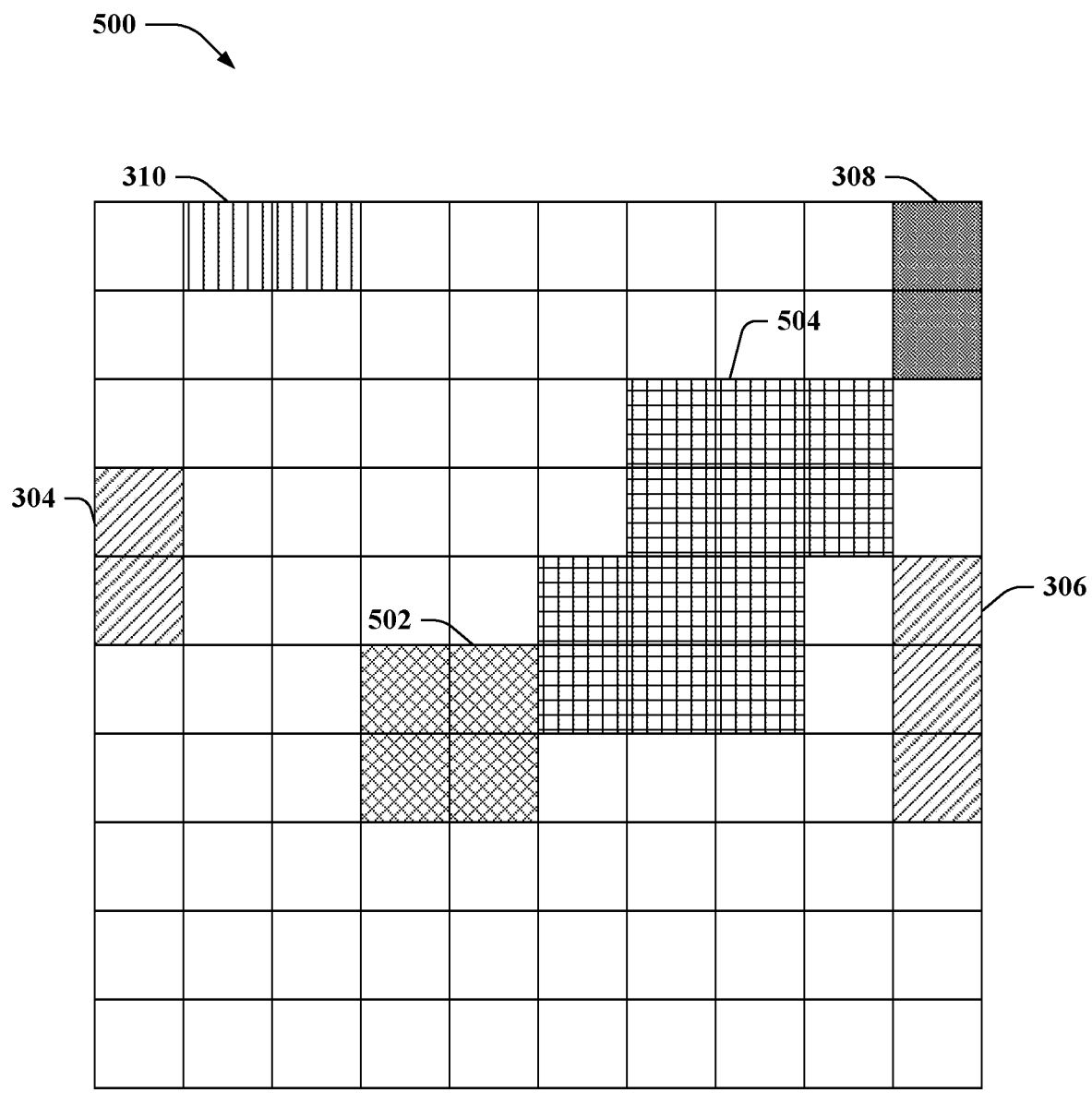
FIGS. 5-6 illustrate exemplary occupancy grids.

Now turning to FIG. 5, illustrated is an exemplary occupancy grid 500 (e.g., one of the time-stepped occupancy grids of the occupancy grid movie 208) according to various embodiments. As shown, the cells 304 and the cells 306 can represent locations of non-tracked objects in the environment surrounding the autonomous vehicle. The cells 308 can represent a location of an undrivable area. The cells 310 can corresponding to a location of an unknown area. Moreover, cells 502 can represent locations of a tracked object at a particular future time (e.g., specified in the predicted objects 402).

The motion planner system 120 can perform a query to determine whether particular cells of the occupancy grid 500 are occupied. For instance, the query depicted in FIG. 5 can be cells 504. The cells 504 can represent the autonomous vehicle 100. For instance, a location of the cells 504 in the occupancy grid 500 can indicate a proposed location for the autonomous vehicle 100 in the environment at the future time corresponding to the occupancy grid 500. Moreover, an orientation of the cells 504 in the occupancy grid 500 can indicate a proposed orientation of the autonomous vehicle 100 in the environment at the future time corresponding to the occupancy grid 500. The query can be performed to identify whether any of the cells 504 overlap cells corresponding to tracked objects, non-tracked objects, undrivable areas, or unknown areas. For instance, in the depicted example of FIG. 5, the cells 504 are shown as not overlapping any of the cells 304, 306, 308, 310, or 502.

Figure 6:
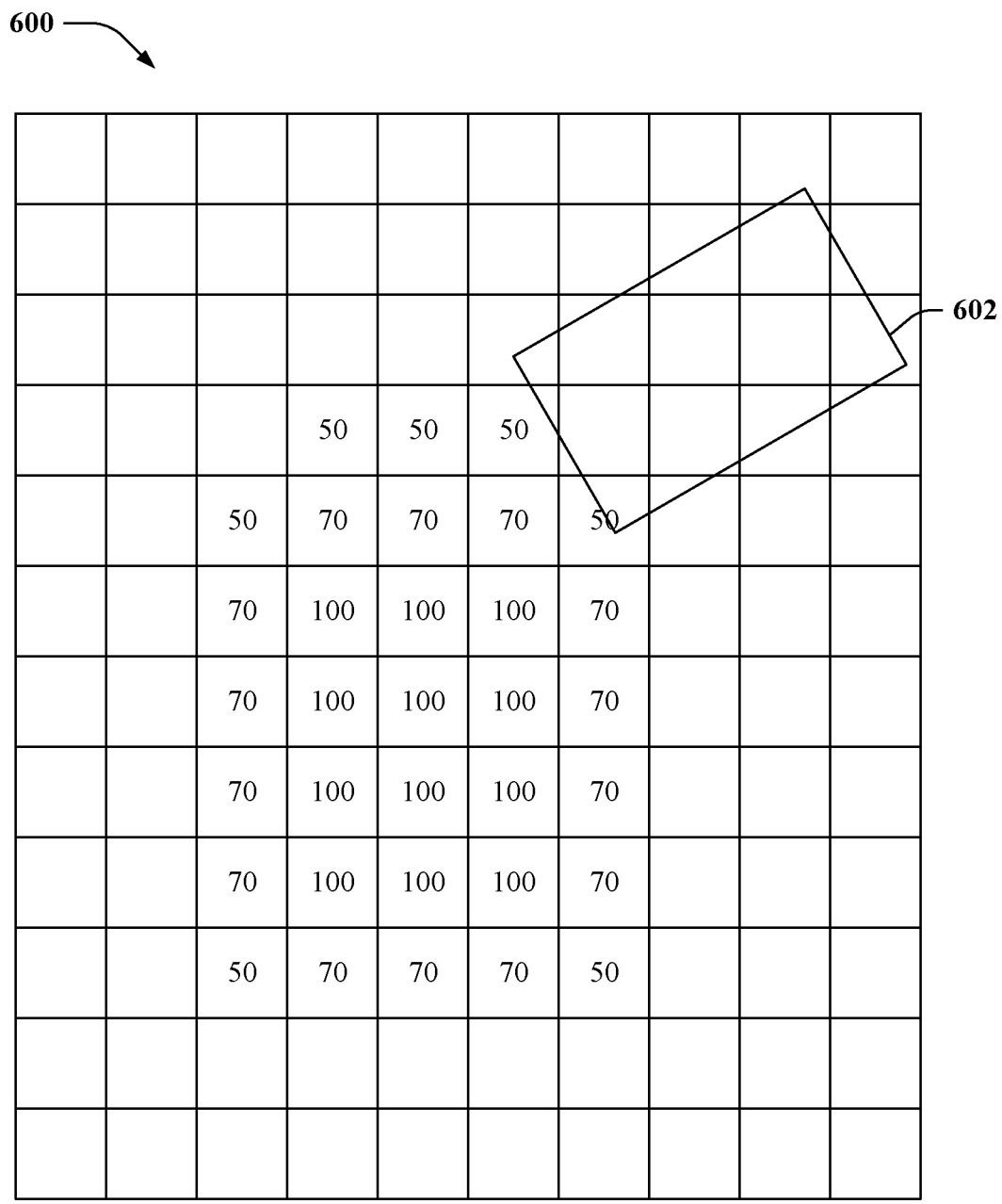

Now turning to FIG. 6, illustrated is another exemplary occupancy grid 600. As described herein, the occupancy movie generation system 118 can generate an occupancy grid movie (e.g., the occupancy grid movie 208) that includes time-stepped occupancy grids for future times (such as the occupancy grid 600), which each include cells corresponding to regions in the environment surrounding the autonomous vehicle. Moreover, according to an example, the occupancy movie generation system 118 can assign probabilities to cells specifying likelihoods that the regions corresponding to the cells are occupied at the future times. As depicted in FIG. 6, cells in the occupancy grid 600 can be assigned probabilities specifying the likelihoods that the regions corresponding to the cells are occupied at a time corresponding to the occupancy grid 600 (e.g., the probabilities can be covariances). Following this example, the motion planner system 120 can query particular cells of the occupancy grid 600 for probabilities specifying likelihoods that regions corresponding to the particular cells are occupied. Thus, for instance, cells corresponding to an object 602 can be queried for the probabilities specifying the likelihoods that the regions corresponding to the particular cells are occupied. According to an illustration, any cell in which the object 602 is at least partially in can be considered to be a location of the object 602 (e.g., as determines using a scan fill algorithm). Pursuant to another example, the cells in which the object 602 is at least partially located can be based on a cached query object as described herein.

Figure 7:
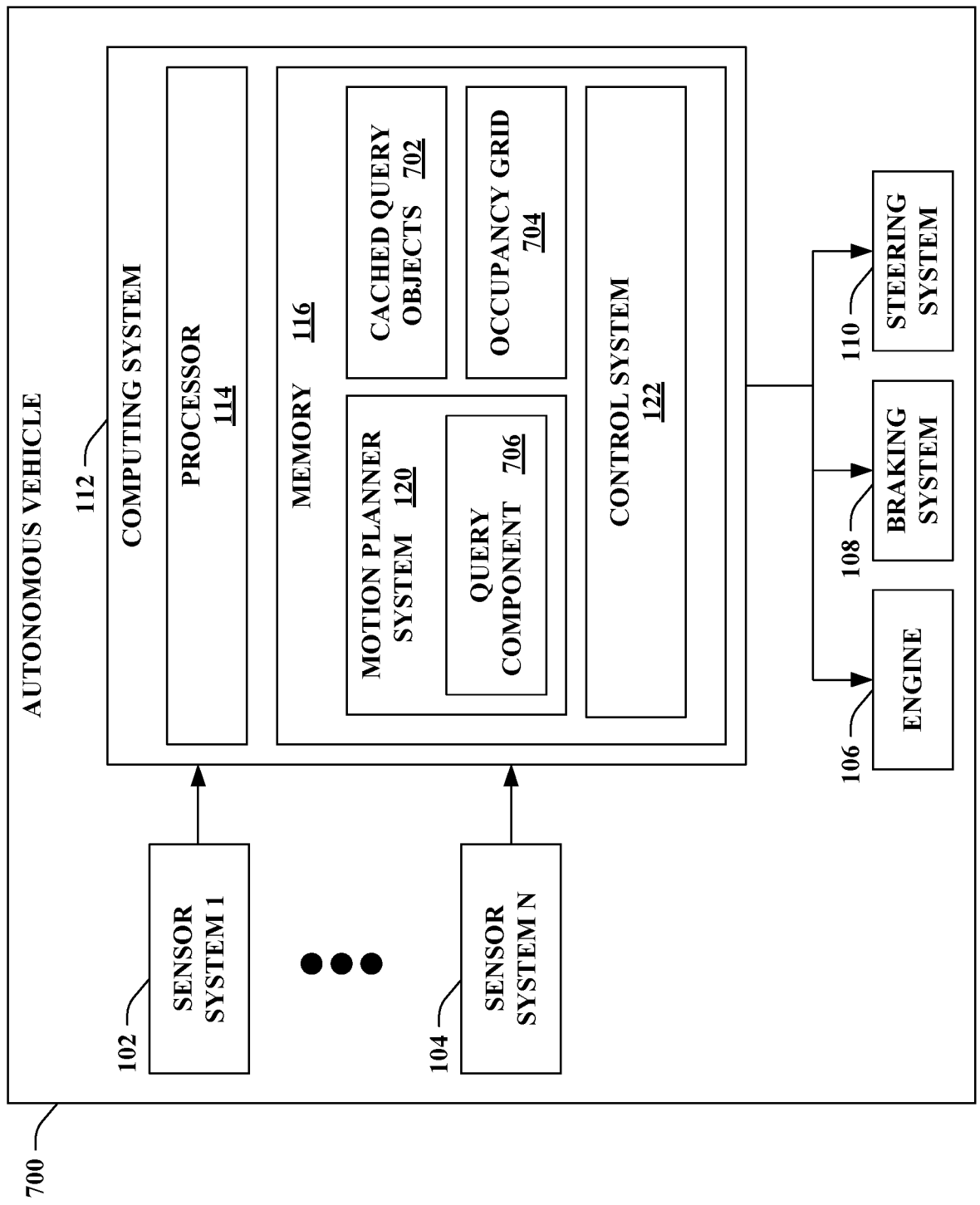
FIG. 7 illustrates another functional block diagram of an exemplary autonomous vehicle (e.g., the autonomous vehicle of FIG. 1).

Now turning to FIG. 7, illustrated is another exemplary autonomous vehicle 700 (e.g., the autonomous vehicle 100) in accordance with various embodiments. The autonomous vehicle 700, similar to above, includes the sensor systems 102-104, the mechanical systems (e.g., the engine 106, the braking system 108, the steering system 110, etc.), and the computing system 112. The computing system 112 can include the processor 114 and the memory 116. As discussed above, the memory 116 can include the motion planner system 120 and the control system 122.

The memory 116 can further store cached query objects 702 and at least one occupancy grid 704. The cached query objects 702 respectively specify indices of cells of a grid occupied by a representation of the autonomous vehicle 700 at corresponding orientations. As described herein, the motion planner system 120 can generate a motion plan for the autonomous vehicle 700. The motion planner system 120 can query whether particular cells of the occupancy grid 704 are occupied. As described herein, the occupancy grid 704 can be a particular time-stepped occupancy grid from time-stepped occupancy grids of an occupancy grid movie (e.g., generated by the occupancy movie generation system 118). Thus, according to an example, the memory 116 can further include the occupancy movie generation system 118.

The motion planner system 120 can further include a query component 706 that can perform the query of the occupancy grid 704 (as well as substantially any number of additional queries of the occupancy grid 704 and/or differing occupancy grids). The query component 706 can select a cached query object from the cached query objects 702 based on the proposed orientation of the autonomous vehicle 700. Moreover, the query component 706 can translate the cached query object based on a proposed location of the autonomous vehicle 700. The query component 706 can further query whether cells of the occupancy grid 704 for the environment surrounding the autonomous vehicle 700 are occupied utilizing the cached query object has translated. The motion planner system 120 can generate the motion plan for the autonomous vehicle 700 based on whether the cells of the occupancy grid 704 are occupied. Further, the control system 122 can control the engine 106, the braking system 108, and/or the steering system 110 based on the motion plan for the autonomous vehicle 700.

According to an example, the query component 706 can translate the cached query object based on the proposed location of the autonomous vehicle 700 by adding a particular value to each of the indices of the cached query object. The particular value can be based on the proposed location of the autonomous vehicle 700 for the query.

According to another example, the query component 706 can translate the cached query object based on the proposed location of the autonomous vehicle 700 by subtracting a particular value from each of the indices of the cached query object. Again, the particular value can be based on the proposed location of the autonomous vehicle 700.

According to an example, the orientations of the representation of the autonomous vehicle 700 in the grid for the cached query objects 702 can be at a predefined rotation interval. For instance, the predefined rotation interval can be 1°. Following this example, 360 cached query objects 702 can be stored in the memory 116 for the representation of the autonomous vehicle 700 (e.g. a first cached query object can be for a 0 degree orientation, a second cache query object can be for a 1 degree orientation, . . . , and a 360th cached query object can be for a 359 degree orientation). According to another example, the predefined rotation interval can be 10°. Following this example, 36 cached query objects 702 can be stored in the memory 116, (e.g., a first cached query object can be for a 0 degree orientation, a second cached query object can be for a 10 degree orientation, . . . ).

Moreover, it is contemplated that the cached query objects 702 can include different representations of the autonomous vehicle 700 at the various orientations. For example, the cached query objects 702 can include a first subset that specify indices of cells of a grid occupied by a first representation of the autonomous vehicle 700 at corresponding orientations, and a second subset (e.g., differing cached query objects as compared to the cached query objects of the first subset) that specify indices of cells of the grid occupied by a second representation of the autonomous vehicle 700 at the corresponding orientations. Further, the first representation of the autonomous vehicle 700 can be a first shape, and the second representation of the autonomous vehicle 700 can be a second shape that differs from the first shape. For example, the first shape can be a rectangle and the second shape can be a trapezoid. According to another example, the first shape can be a rectangle and the second shape can be a non-rectangular polygon. Yet, it is contemplated that substantially any shapes are intended to fall within the scope of the hereto appended claims. Moreover, it is contemplated that more than two shapes can be maintained as part of the cashed query objects 702.

By way of illustration, it is contemplated that the query component 706 can select a cached query object for a query from the cached query objects 702 based on a proposed orientation of the autonomous vehicle 700 and a step of a motion planning process. For instance, different steps of the motion planning process can utilize different shaped representations of the autonomous vehicle 700. By way of illustration, a first step of the motion planning process can determine a path (e.g., where in a lane the autonomous vehicle 700 should be driving), and a second step of the motion planning process can determine a speed along the path. Following this illustration, the different steps can utilize differing shapes for the representation of the autonomous vehicle 700. The cached query objects 702 enable providing a lookup based system for generating the queries, which can reduce a duration of time and computing resources utilized to perform each of the queries. Moreover, the cached query objects 702 enable the motion planner system 120 to solve a convex problem along a longitudinal path, allowing determinations to be made concerning whether to change speed when appropriate.

Figure 8:
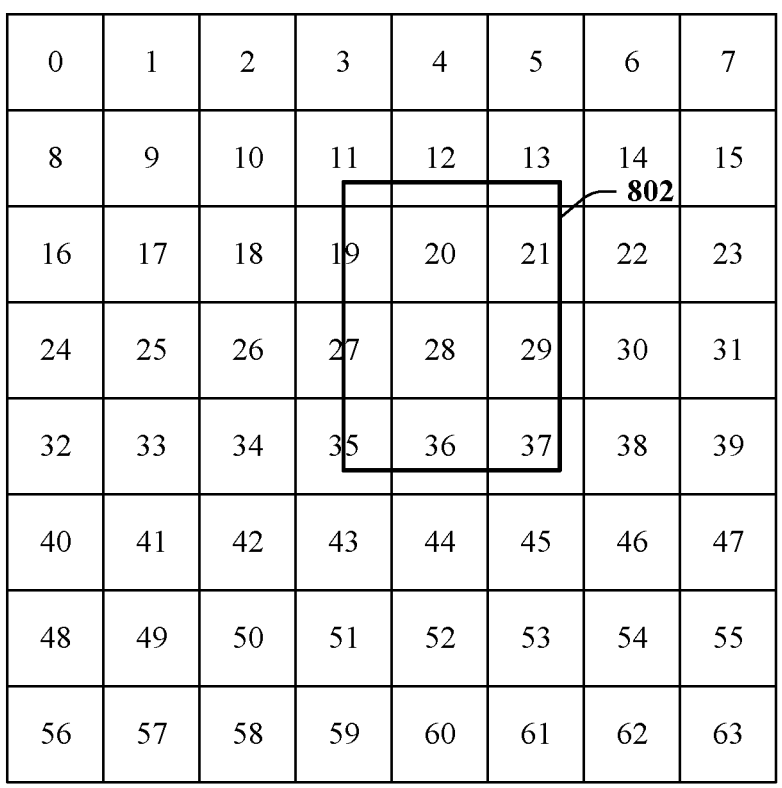
FIGS. 8-11 illustrate exemplary grids that include representations of exemplary cached query objects.

Now turning to FIG. 8, illustrated is an exemplary grid 800 that includes a representation of a cached query object 802. The cached query object 802 can correspond to a representation of an autonomous vehicle (e.g., the autonomous vehicle 100, the autonomous vehicle 700) at a corresponding orientation (e.g., a 0 degree orientation). In the depicted example of FIG. 8, the cached query object 802 overlaps cells with indices 11, 12, 13, 19, 20, 21, 27, 28, 29, 35, 36, and 37. Thus, the cached query object 802 stored in the memory 116 for a rectangular representation of the autonomous vehicle with a 0 degree orientation can be a list specifying indices 11, 12, 13, 19, 20, 21, 27, 28, 29, 35, 36, and 37.

Figure 9:
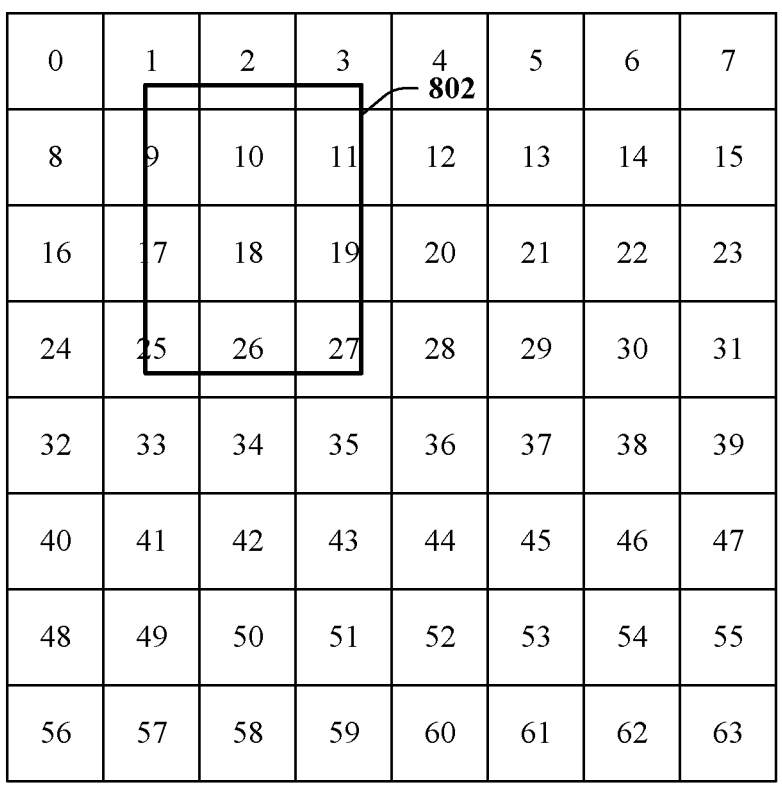

Now turning to FIG. 9, illustrated is an exemplary grid 900 depicting translation of the cached query object 802 of FIG. 8. The cached query object 802 for the rectangular representation of the autonomous vehicle with the 0 degree orientation can be translated to a proposed location shown in FIG. 9 by subtracting a particular value from each of the indices of the cached query object 802. In the example shown, the particular value subtracted from each of the indices is 10. Accordingly, as translated the cached query object 802 can overlap indices 1, 2, 3, 9, 10, 11, 17, 18, 19, 25, 26, and 27. Accordingly, with the cached query object 802 as translated in FIG. 9, a query of an occupancy grid (e.g., the occupancy grid 704) can be performed to determine whether the cells corresponding to indices 1, 2, 3, 9, 10, 11, 17, 18, 19, 25, 26, and 27 are occupied. Thus, a cached query object can be translated by adding a particular value or subtracting a particular value, which reduces an amount of time and an amount of computational resources needed to generate and executed queries as compared to conventional approaches.

Figure 10:
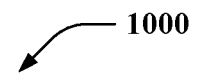

Now turning to FIG. 10, illustrated is another exemplary grid 1000. As depicted in FIG. 10, the grid 1000 includes a cached query object 1002 that corresponds to a representation of the autonomous vehicle (e.g., the autonomous vehicle 100, the autonomous vehicle 700) at a 90 degree orientation (e.g., the cached query object 1002 is rotated 90 degrees with respect to the cached query object 802 shown in FIG. 8). In the example shown in FIG. 10, the cached query object 1002 overlaps cells with indices 18, 19, 20, 21, 26, 27, 28, 29, 34, 35, 36, and 37. Thus, the cached query object 1002 stored in the memory 116 for a rectangular representation of the autonomous vehicle with a 90 degree orientation can be a list specifying indices 18, 19, 20, 21, 26, 27, 28, 29, 34, 35, 36, and 37.

Figure 11:
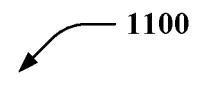

With reference to FIG. 11, illustrated is yet another exemplary grid 1100. The grid 1100 includes a cached query object 1102. The cached query object 1102 corresponds to a trapezoidal representation of the autonomous vehicle at a 0 degree orientation. In the depicted example, the cached query object 1102 overlaps cells with indices 11, 12, 13, 19, 20, 21, 26, 27, 28, 29, 30, 34, 35, 36, 37, and 38. Accordingly, the cached query object 1102 stored in the memory 116 for a trapezoidal representation of the autonomous vehicle with a 0 degree orientation can be a list specifying indices 11, 12, 13, 19, 20, 21, 26, 27, 28, 29, 30, 34, 35, 36, 37, and 38.

Reference is generally made to FIGS. 7-11. The query component 706 can select a particular cached query object based on a proposed orientation and a shape of a representation of the autonomous vehicle 700. The shape, for instance, can be based on a step of a motion planning process for which the query is being performed. For instance, the query component 706 can select the cached query object 1102 for a particular query. Further, as described herein, the query component 706 can translate the cached query object 1102 (e.g., by adding or subtracting a particular value based on a proposed location) for the particular query. Thereafter, the cached query object 1102 as translated can be utilized to query an occupancy grid.

Figure 12:
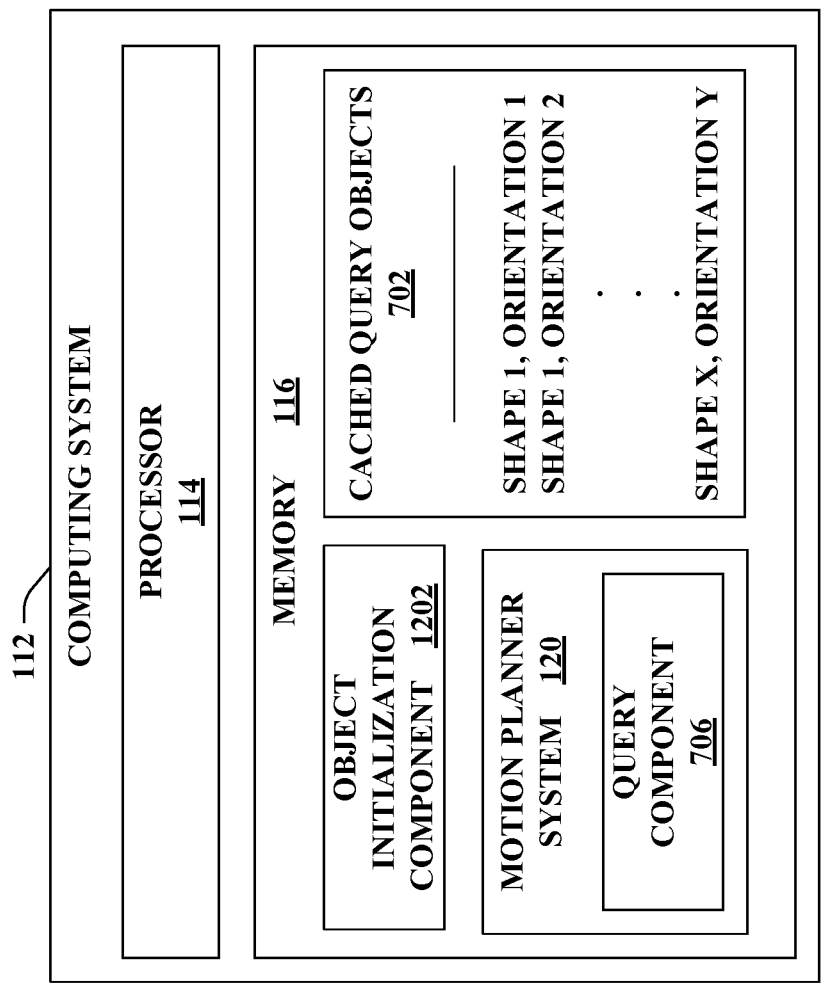
FIG. 12 illustrates a functional block diagram of a computing system of the autonomous vehicle of FIG. 7 in accordance with various examples

Referring now to FIG. 12, illustrated is the computing system 112 of the autonomous vehicle 700 in accordance with various examples. Again, the computing system 112 includes the processor 114 and the memory 116. The memory 116 includes the motion planner system 120, which can further include the query component 706. The memory 116 further includes an object initialization component 1202 that can create the cached query objects 702. Moreover, the object initialization component 1202 can retain the cached query objects 702 in the memory 116.

The object initialization component 1202 can create the cached query objects 702, which each respectively specify indices of cells of a grid occupied by a representation of the autonomous vehicle 700 at a corresponding orientation. The object initialization component 1202 can create cached query objects 702 of X differing shapes corresponding to representations of the autonomous vehicle 700 (e.g., X can be 2, 3, 4, or substantially any other integer). For instance, the differing shapes can include a rectangle, a trapezoid, and a non-rectangular polygon; yet, the claimed subject matter is not so limited. Moreover, each of the shapes can be oriented in Y different orientations; thus, the object initialization component 1202 can create cached query objects 702 having Y differing orientations (e.g., Y can be 1, . . . , 360); however, it is contemplated that more than 360 differing orientations can be utilized in accordance with various examples.

The object initialization component 1202 can create the cached query objects 702 once for the autonomous vehicle 700. However, it is to be appreciated that the object initialization component 1202 can recreate the cached query objects 702. Moreover, according to an example, the object initialization component 1202 can utilize a scan fill algorithm to generate the cached query objects 702; yet, the claimed subject matter is not so limited.

Figure 13:
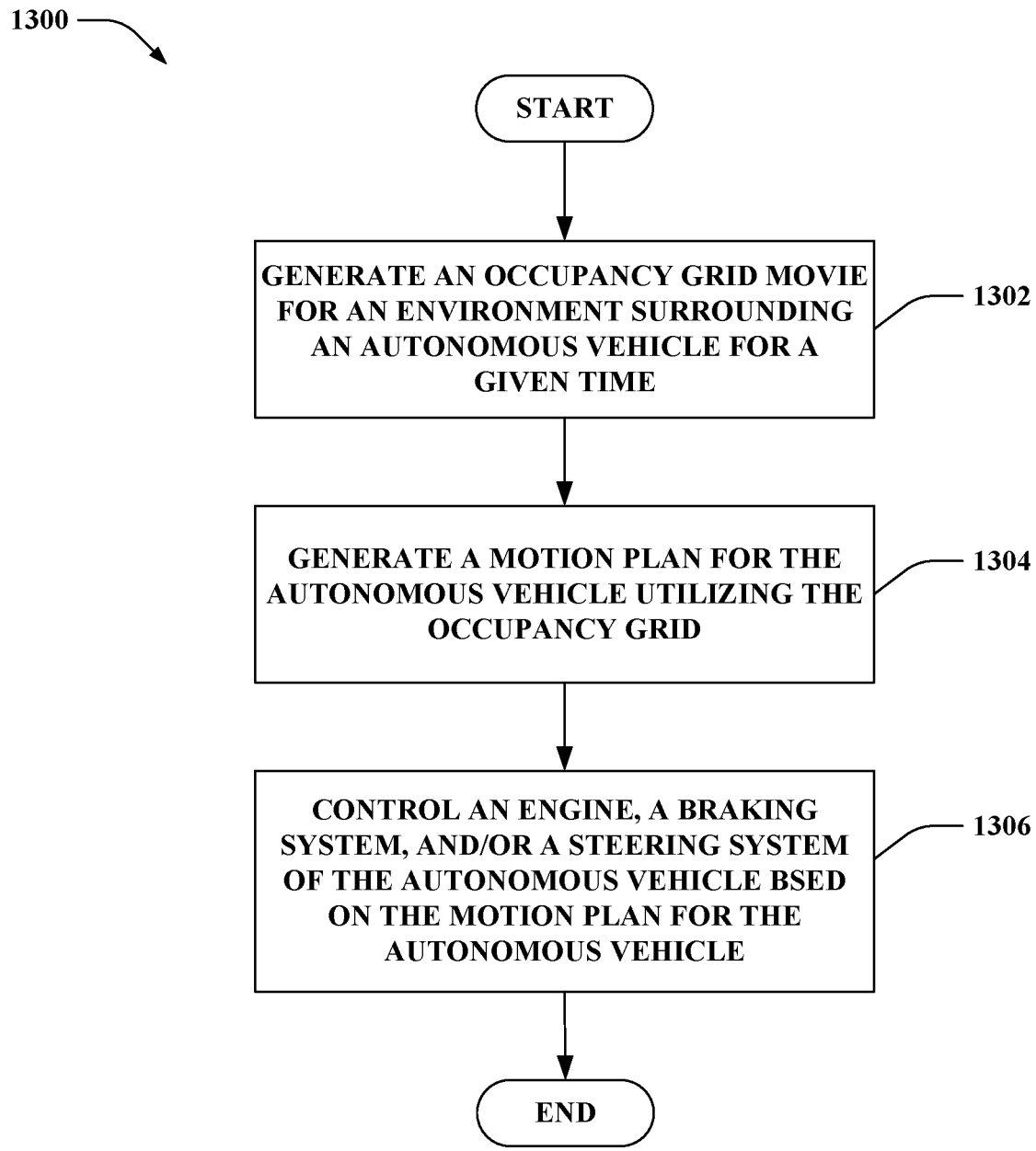
FIG. 13 is a flow diagram that illustrates an exemplary methodology for controlling motion planning of an autonomous vehicle utilizing an occupancy grid movie.
Figure 14:
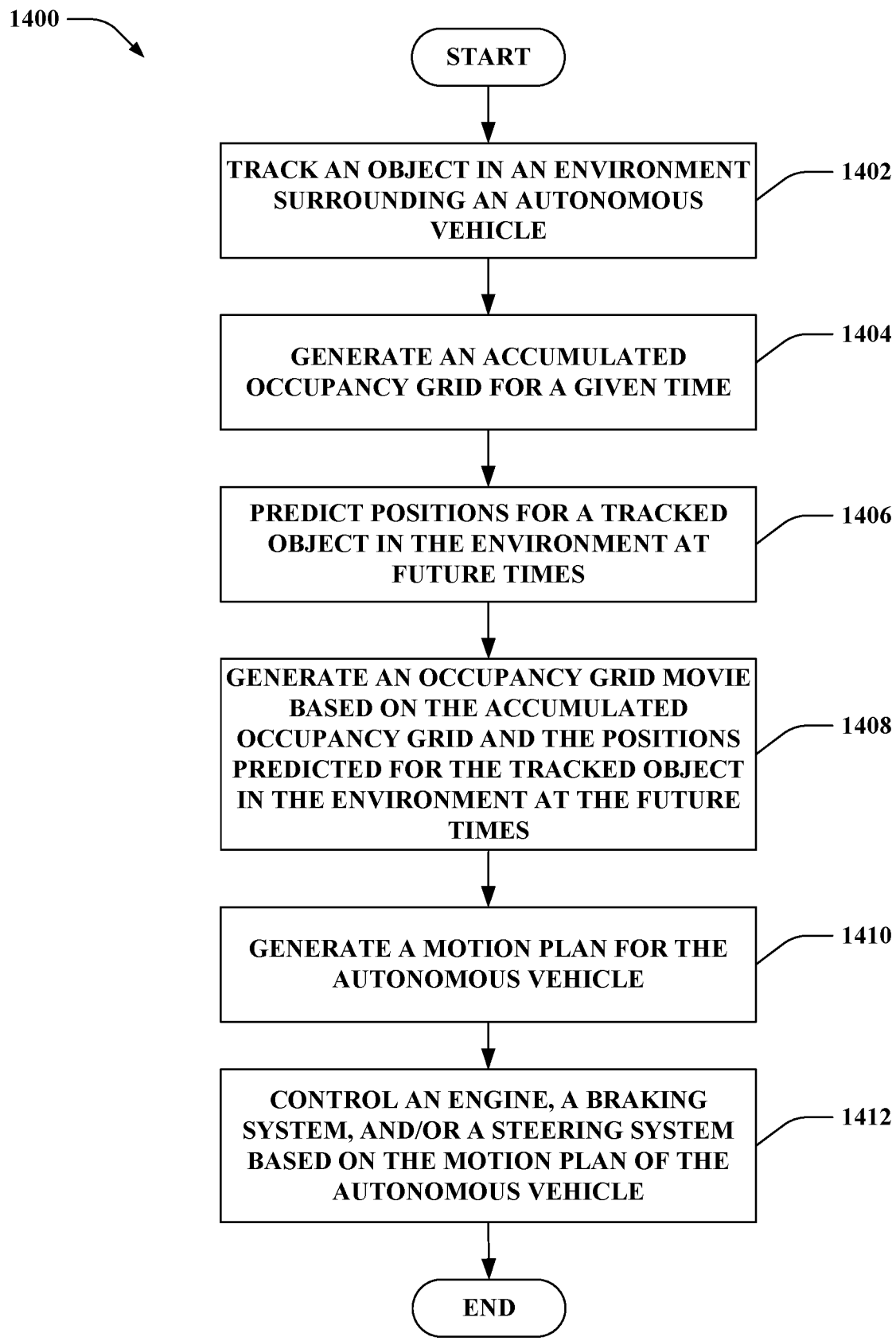
FIG. 14 is a flow diagram that illustrates another exemplary methodology for controlling motion planning of an autonomous vehicle utilizing an occupancy grid movie.
Figure 15:
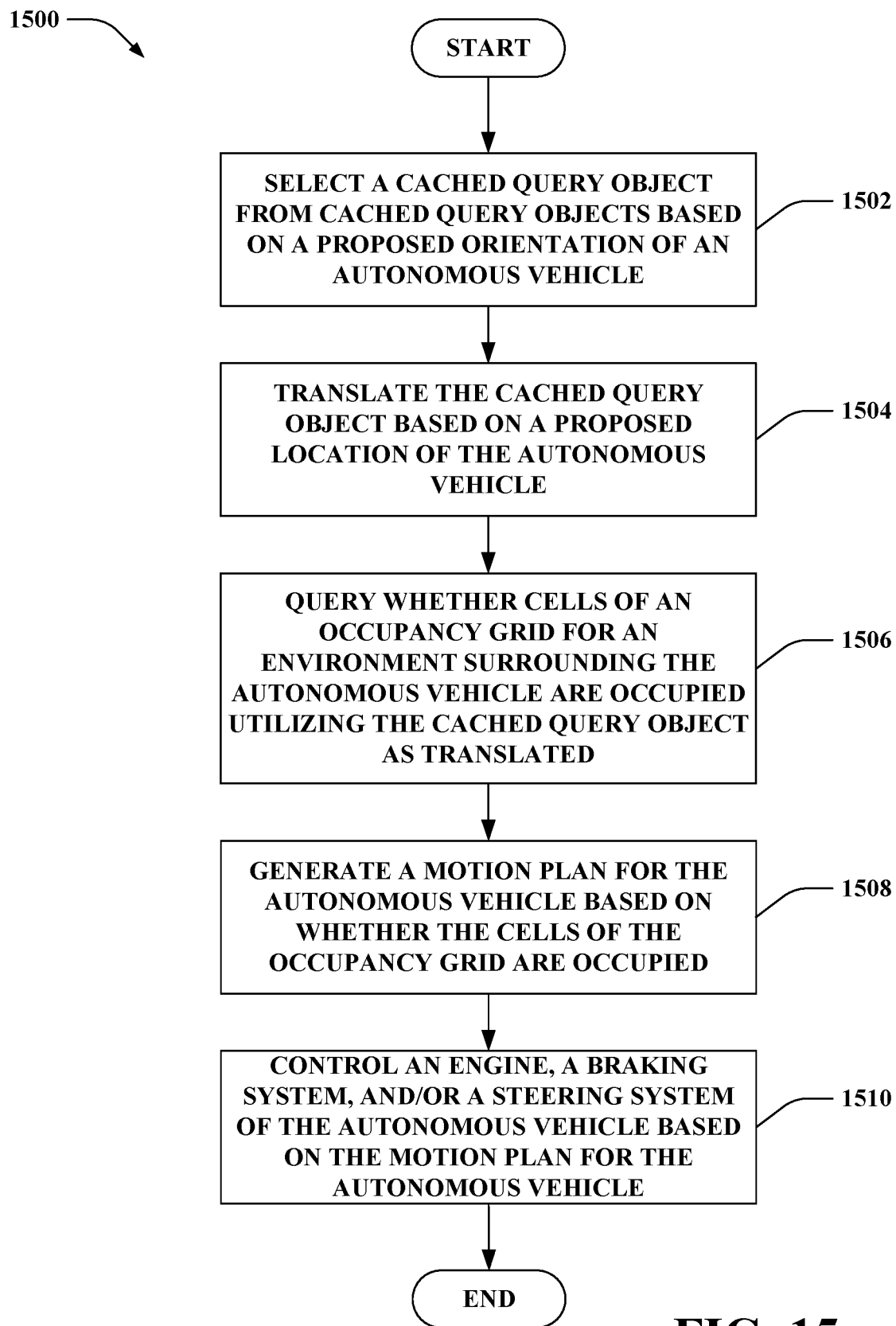
FIG. 15 is a flow diagram that illustrates an exemplary methodology for utilizing cached query objects to query occupancy grids as part of motion planning for an autonomous vehicle.

FIGS. 13-15 illustrate exemplary methodologies relating to generating an occupancy grid movie and/or querying occupancy grid(s) (from the occupancy grid movie) utilizing cached query objects as part of motion planning for an autonomous vehicle. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 13 illustrates a methodology 1300 for controlling motion planning of an autonomous vehicle utilizing an occupancy grid movie. At 1302, the occupancy grid movie can be generated for an environment surrounding the autonomous vehicle for a given time. The occupancy grid movie can include time-stepped occupancy grids for future times that are at predefined time intervals from the given time. The time-stepped occupancy grids for the future times in the occupancy grid movie can each include cells corresponding to regions in the environment. According to an example, probabilities can be assigned to the cells specifying likelihoods that the regions corresponding to the cells are occupied at the future times. At 1304, a motion plan can be generated for the autonomous vehicle utilizing the occupancy grid movie. At 1306, an engine of the autonomous vehicle, a braking system of the autonomous vehicle, and/or a steering system of the autonomous vehicle can be controlled based on the motion plan for the autonomous vehicle.

Turning now to FIG. 14, illustrated is another methodology 1400 for controlling motion planning of an autonomous vehicle utilizing an occupancy grid movie. At 1402, an object in an environment surrounding the autonomous vehicle can be tracked based on data outputted by a sensor system of the autonomous vehicle for a given time. The object tracked in the environment can be a tracked object. At 1404, an accumulated occupancy grid for the given time can be generated based at least in part on the data outputted by the sensor system for the given time. For instance, the tracked object in the environment can be removed to generate the accumulated occupancy grid for the given time. At 1406, positions can be predicted for the tracked object in the environment at future times. The future times can be at predefined time intervals from the given time. At 1408, the occupancy grid movie can be generated based on the accumulated occupancy grid and the positions predicted for the tracked object in the environment at the future times. The occupancy grid movie includes time-stepped occupancy grids for the future times. At 1410, a motion plan can be generated for the autonomous vehicle utilizing the occupancy grid movie. At 1412, at least one of an engine of the autonomous vehicle, a braking system of the autonomous vehicle, or a steering system of the autonomous vehicle can be controlled based on the motion plan for the autonomous vehicle.

Turning to FIG. 15, illustrated is a methodology 1500 for utilizing cached query objects to query occupancy grids as part of motion planning for an autonomous vehicle. At 1502, a cached query object can be selected from cached query objects based on a proposed orientation of the autonomous vehicle. The cached query objects respectively specify indices of cells of a grid occupied by a representation of the autonomous vehicle at corresponding orientations. Moreover, the cached query objects can be stored in memory of the autonomous vehicle. At 1504, the cached query object can be translated based on a proposed location of the autonomous vehicle. At 1506, a query can be performed to determine whether cells of an occupancy grid for an environment surrounding the autonomous vehicle are occupied utilizing the cached query object as translated. At 1508, a motion plan can be generated for the autonomous vehicle based on whether the cells of the occupancy grid are occupied. At 1510, at least one of an engine of the autonomous vehicle, a braking system of the autonomous vehicle, or a steering system of the autonomous vehicle can be controlled based on the motion plan for the autonomous vehicle.

Figure 16:
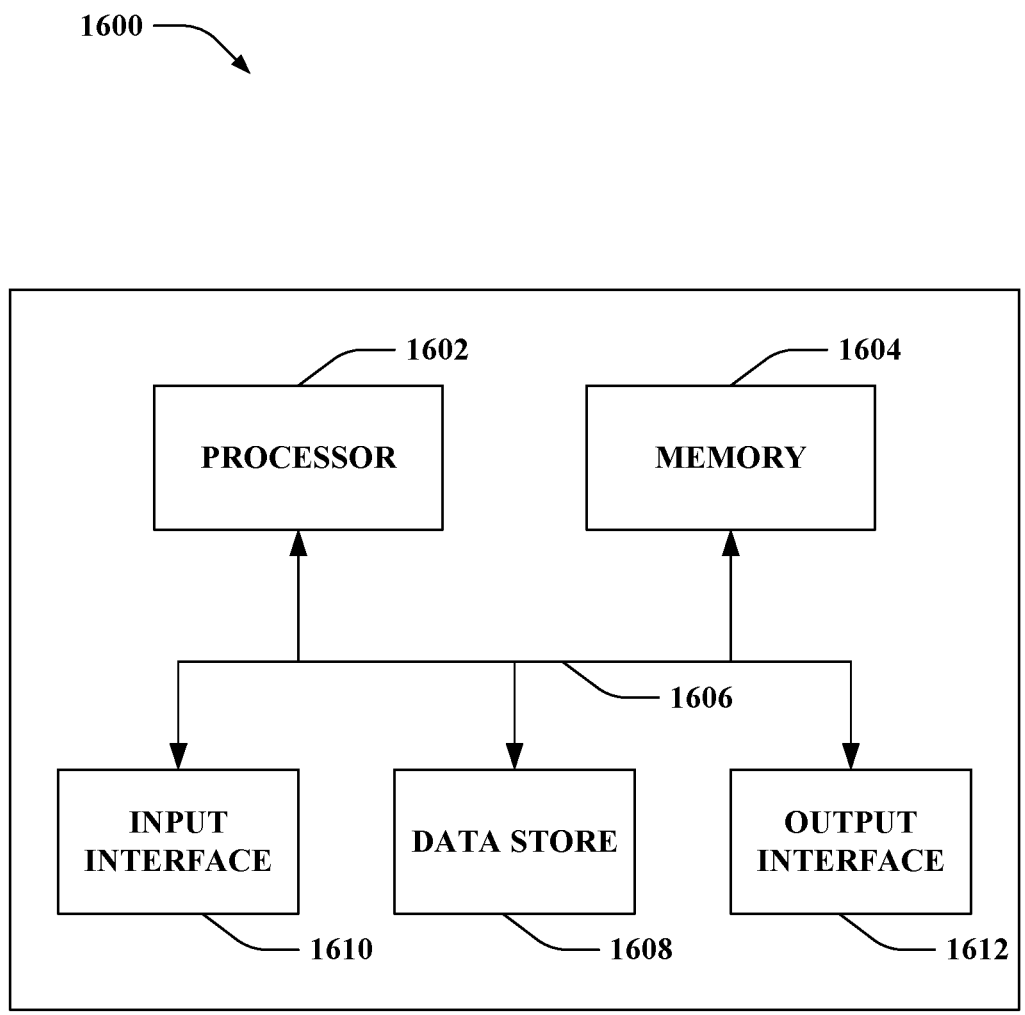
FIG. 16 illustrates an exemplary computing device.

Referring now to FIG. 16, a high-level illustration of an exemplary computing device 1600 that can be used in accordance with the systems and methodologies disclosed herein is illustrated. For instance, the computing device 1600 may be or include the computing system 112. The computing device 1600 includes at least one processor 1602 that executes instructions that are stored in a memory 1604. The instructions may be, for instance, instructions for implementing functionality described as being carried out by one or more systems discussed above or instructions for implementing one or more of the methods described above. The processor 1602 may be a GPU, a plurality of GPUs, a CPU, a plurality of CPUs, a multi-core processor, etc. The processor 1602 may access the memory 1604 by way of a system bus 1606. In addition to storing executable instructions, the memory 1604 may also store occupancy grid movie(s), occupancy grids, cached query objects, predicted objects, accumulated occupancy grid(s), and so forth.

The computing device 1600 additionally includes a data store 1608 that is accessible by the processor 1602 by way of the system bus 1606. The data store 1608 may include executable instructions, occupancy grid movie(s), occupancy grids, cached query objects, predicted objects, accumulated occupancy grid(s), etc. The computing device 1600 also includes an input interface 1610 that allows external devices to communicate with the computing device 1600. For instance, the input interface 1610 may be used to receive instructions from an external computer device, etc. The computing device 1600 also includes an output interface 1612 that interfaces the computing device 1600 with one or more external devices. For example, the computing device 1600 may transmit control signals to the engine 106, the braking system 108, and/or the steering system 110 by way of the output interface 1612.

Additionally, while illustrated as a single system, it is to be understood that the computing device 1600 may be a distributed system. Thus, for instance, several devices may be in communication by way of a network connection and may collectively perform tasks described as being performed by the computing device 1600.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An autonomous vehicle, comprising:
a computing system, comprising:
a processor; and
memory storing:
cached query objects that respectively specify indices of cells of a grid occupied by a representation of the autonomous vehicle; and
computer-executable instructions that, when executed by the processor, cause the processor to perform acts comprising:
selecting a first shaped cached query object from the cached query objects that provides a first representation of the autonomous vehicle;
querying whether first cells of an occupancy grid for an environment surrounding the autonomous vehicle are occupied utilizing the first shaped cached query object;
determining a first portion of a motion plan for the autonomous vehicle based on whether the first cells of the occupancy grid are occupied;
selecting a second shaped cached query object from the cached query objects that provides a differing second representation of the autonomous vehicle, wherein the first shaped cached query object and the second shaped cached query object have differing shapes;
querying whether second cells of the occupancy grid for the environment surrounding the autonomous vehicle are occupied utilizing the second shaped cached query object;
determining a second portion of the motion plan for the autonomous vehicle based on whether the second cells of the occupancy grid are occupied; and
controlling the autonomous vehicle based on the motion plan.

2. The autonomous vehicle of claim 1, wherein the first shaped cached query object is selected for a first step of a motion planning process, and the second shaped cached query object is selected for a second step of a motion planning process.

3. The autonomous vehicle of claim 1, wherein the first portion of the motion plan comprises a path for motion of the autonomous vehicle, and the second portion of the motion plan comprises a speed of the autonomous vehicle when traveling along the path.

4. The autonomous vehicle of claim 1, wherein the first shaped cached query object has a rectangular shape, and the second shaped cached query object as a trapezoidal shape.

5. The autonomous vehicle of claim 1, wherein the first shaped cached query object is a rectangle, and the second shaped cached query object is a non-rectangular polygon.

6. The autonomous vehicle of claim 1, the memory further stores computer-executable instructions that, when executed by the processor, cause the processor to perform acts comprising:
translating the first shaped cached query object based on a proposed location of the autonomous vehicle, wherein the first cells of the occupancy grid are queried utilizing the first shaped cached query object as translated; and
translating the second shaped cached query object based on the proposed location of the autonomous vehicle, wherein the second cells of the occupancy grid are queried utilizing the second shaped cached query object as translated.

7. The autonomous vehicle of claim 1, wherein the first shaped cached query object and the second shaped cached query object are selected based on a proposed orientation of the autonomous vehicle.

8. The autonomous vehicle of claim 7, wherein orientations of the representations of the autonomous vehicle in the grid for the cached query objects are at a predefined rotation interval.

9. The autonomous vehicle of claim 8, wherein the predefined rotation interval is 1 degree.

10. The autonomous vehicle of claim 8, wherein the predefined rotation interval is 10 degrees.

11. The autonomous vehicle of claim 1, further comprising:
an engine;
a braking system; and
a steering system;
wherein the computing system is in communication with the engine, the braking system, and the steering system, and wherein controlling the autonomous vehicle based on the motion plan further comprises controlling at least one of the engine, the braking system, or the steering system based on the motion plan.

12. A method performed by a processor of a computing system of an autonomous vehicle, comprising:
selecting a first shaped cached query object from cached query objects that provides a first representation of the autonomous vehicle, the cached query objects respectively specify indices of cells of a grid occupied by a representation of the autonomous vehicle;
querying whether first cells of an occupancy grid for an environment surrounding the autonomous vehicle are occupied utilizing the first shaped cached query object;
determining a first portion of a motion plan for the autonomous vehicle based on whether the first cells of the occupancy grid are occupied;
selecting a second shaped cached query object from the cached query objects that provides a differing second representation of the autonomous vehicle, wherein the first shaped cached query object and the second shaped cached query object have differing shapes;
querying whether second cells of the occupancy grid for the environment surrounding the autonomous vehicle are occupied utilizing the second shaped cached query object;
determining a second portion of the motion plan for the autonomous vehicle based on whether the second cells of the occupancy grid are occupied; and
controlling the autonomous vehicle based on the motion plan.

13. The method of claim 12, wherein the first shaped cached query object is selected for a first step of a motion planning process, and the second shaped cached query object is selected for a second step of a motion planning process.

14. The method of claim 12, wherein the first portion of the motion plan comprises a path for motion of the autonomous vehicle, and the second portion of the motion plan comprises a speed of the autonomous vehicle when traveling along the path.

15. The method of claim 12, wherein the first shaped cached query object has a rectangular shape, and the second shaped cached query object as a trapezoidal shape.

16. The method of claim 12, wherein the first shaped cached query object is a rectangle, and the second shaped cached query object is a non-rectangular polygon.

17. The method of claim 12, further comprising:
translating the first shaped cached query object based on a proposed location of the autonomous vehicle, wherein the first cells of the occupancy grid are queried utilizing the first shaped cached query object as translated; and
translating the second shaped cached query object based on the proposed location of the autonomous vehicle, wherein the second cells of the occupancy grid are queried utilizing the second shaped cached query object as translated.

18. The method of claim 12, wherein the first shaped cached query object and the second shaped cached query object are selected based on a proposed orientation of the autonomous vehicle.

19. A computing system, comprising:
a processor; and
memory storing:
cached query objects that respectively specify indices of cells of a grid occupied by a representation of an autonomous vehicle; and
computer-executable instructions that, when executed by the processor, cause the processor to perform acts comprising:
selecting a first shaped cached query object from the cached query objects that provides a first representation of the autonomous vehicle;
querying whether first cells of an occupancy grid for an environment surrounding the autonomous vehicle are occupied utilizing the first shaped cached query object;
determining a first portion of a motion plan for the autonomous vehicle based on whether the first cells of the occupancy grid are occupied;
selecting a second shaped cached query object from the cached query objects that provides a differing second representation of the autonomous vehicle, wherein the first shaped cached query object and the second shaped cached query object have differing shapes;
querying whether second cells of the occupancy grid for the environment surrounding the autonomous vehicle are occupied utilizing the second shaped cached query object;

determining a second portion of the motion plan for the autonomous vehicle based on whether the second cells of the occupancy grid are occupied; and controlling the autonomous vehicle based on the motion plan.

20. The computing system of claim 19, wherein the first shaped cached query object is selected for a first step of a motion planning process, and the second shaped cached query object is selected for a second step of a motion planning process.

* * * * *